United States Patent Office 3,372,991
Patented Mar. 12, 1968

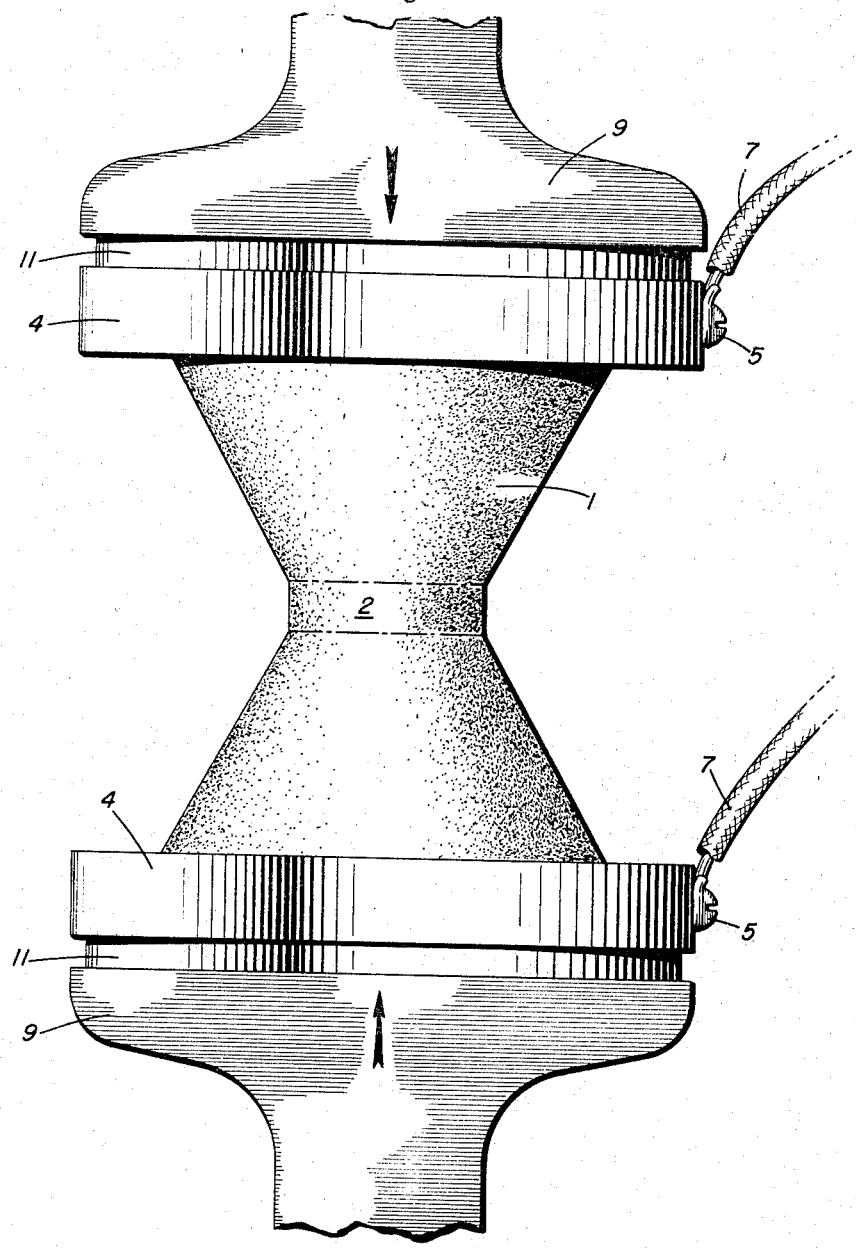

3,372,991
METHOD OF PRODUCING PYROLYTIC GRAPHITE
William H. Avery, Silver Spring, Md., assignor to the United States of America as represented by the Secretary of the Navy
Filed Aug. 14, 1964, Ser. No. 392,071
4 Claims. (Cl. 23—209.3)

ABSTRACT OF THE DISCLOSURE

The invention relates to a method for producing anisotropic graphite from ordinary graphite. According to the invention, a block of ordinary graphite is first shaped to a configuration having a reduced central portion between enlarged end portions. Pressure and electric current are applied on the graphite block through its enlarged end portions, thereby creating anisotropic graphite in the reduced central portion of said block. The central portion is then cut out or otherwise removed from the remainder of the graphite block.

---

This invention relates generally to a process for producing pyrolytic graphite and more particularly to an improved process for producing pyrolytic graphite from a section of common graphite material.

The need for materials that may be subjected to extremely high temperatures and yet maintain satisfactory structural and erosion resistant properties is well-known. The unique thermal properties of pyrolytic graphite have for some years stimulated wide interest in this material. Pyrolytic graphite, in contrast to most other materials, increases in strength with temperatures up to 5000° F., and at temperatures above 3000° F. its strength to density ratio surpasses that of all other available materials. Another important characteristic of this material is its thermal conductivity in a direction parallel to its basal planes which may be as large as $$220 \frac{\text{B.T.U. ft.}}{\text{hr. sq. ft.}} \text{°F.}$$

about equal to copper, while in a direction perpendicular to its basal planes it may be as low as $$0.3 \frac{\text{B.T.U. ft.}}{\text{hr. sq. ft.}} \text{°F.}$$

which is lower than most ceramic installation materials. It is obvious, therefore, that this material could have wide application in space boosters, entry systems, and missiles.

The present method of producing this material involves the decomposition of methane gas. This process is very complex and the resulting product is consequently very expensive and difficult to obtain. The unusual thermal properties of this material can be attributed to the alignment of molecules in relatively distinct layers. Pyrolytic graphite is produced from common graphite by causing the molecules of common graphite to be aligned in such distinct layers.

It is therefore an object of this invention to provide an improved method of producing pyrolytic graphite.

It is another object of this invention to provide a process of producing pyrolytic graphite in a simple and inexpensive manner.

It is still another object of this invention to provide a process of forming pyrolytic graphite which does not require any specialized atmospheric or environmental control.

A still further object of this invention is to provide an apparatus for producing pyrolytic graphite directly from common graphite.

Other objects and many of the attendant advantages of this invention will be readily appreciated as the same becomes better understood by reference to the following detailed description when considered in connection with the accompanying drawing, wherein:

The figure is a diagram of the apparatus used in producing pyrolytic graphite.

The method of forming pyrolytic graphite essentially consists of shaping a section of common graphite to form a reduced central portion, applying a current across that section of graphite, exerting a pressure on said section of graphite, and cutting out said reduced central portion of said graphite. The apparatus used in producing this material includes first and second conducting plates each having a terminal and located at each end of a section of graphite for directing a current from one plate through an interposed section of common graphite to the other plate, a press adapted to apply pressure to said graphite section at each end thereof, and a thermal-electric insulation layer disposed between said conducting plate and said press.

Referring now to the drawing, a section of graphite 1 having a reduced central portion 2 is positioned between two copper conductors 4 each having a terminal 5 connected to a source of electrical current through leads 7. A pressure applying press is shown schematically by pressure plates 9. Interposed between the pressure plates 9 and the copper conductors 4 is a sheet 11 of a thermoelectric insulating material. It is noted here that pyrolytic graphite itself would be an ideal material for this application.

In operation, a current is passed through the graphite section 1. This causes considerable heating in the reduced portion 2 of the graphite section. This high temperature zone should reach temperatures in the range of 2500° C. to 2800° C. The graphite section 1 is then compressed by the pressure plates 9 under pressures of the order of 400–500 kg./cm.² The variables involved are pressure, temperature, height of the graphite section, area of contact between the conductors and graphite, and the cross-section of the high temperature zone. These variables will determine the time required to form pyrolytic graphite and the thickness of the pyrolytic graphite layer obtained. The various combinations of appropriate pressures and temperatures will serve to agitate the graphite molecules and encourage these molecules to distribute themselves in a layerlike fashion. Two distinguishing advantages are realized from the use of the apparatus described. First, no lateral physical support for the reduced central portion 2 is required since all undesirable distortions will occur elsewhere in the graphite section 1, and no elaborate precautions are required to shield the reduced central portion from the presence of the oxidizing atmosphere.

As illustrated in the drawing the reduced central portion 2 as bounded by the phantom lines will under optimum conditions define a layer of pyrolytic graphite. This portion must then be cut out or removed from the remainder of the graphite section.

Obviously, many modifications and variations of the present invention are possible in the light of the above teachings. It is therefore to be understood that within the scope of the appended claims the invention may be practiced otherwise than as specifically described.

What is claimed is:
1. A method of forming pyrolytic graphite, comprising:
   shaping a section of common graphite to form a reduced central portion,
   applying an electric current across said section of graphite, exerting a pressure on said section of graphite, said applied current and said exerted pressure cooperating to impress a temperature within the range of 2500° C. to 2800° C. and a pressure within the range of 400 kg./cm.² to 500 kg./cm.² on the reduced central portion of said section of common graphite, and cutting out said reduced central portion of said graphite section.

2. A method of forming pyrolytic graphite, comprising the steps of:
   shaping a section of common graphite to form a reduced central portion,
   applying an electric current across said section of graphite sufficient to produce heat within said section of the order of 2500 to 2800° C.,
   exerting a pressure of 400 to 500 kg./cm.² on said section of graphite, and
   separating said reduced central portion from the remainder of said graphite section.

3. The method of claim 2, characterized by the fact that the section of graphite is without external physical support during the application of current and pressure.

4. The method of claim 3, further characterized by the fact that the application of current and pressure is performed in the presence of an oxidizing atmosphere.

References Cited
UNITED STATES PATENTS

| | | | |
|---|---|---|---|
| 2,941,244 | 6/1960 | Wentorf | 18—16.5 |
| 3,182,102 | 5/1965 | Simnad | 264—27 X |

OTHER REFERENCES

Frechette et al.: "Proceedings of Conference on Carbon," copyright 1956, University of Buffalo, pp. 189–194.

Fitzer et al.: "Industrial Carbon and Graphite," 1958, Soc. of Chem. Ind., London, pp. 135–144.

Ubbelohde et al.: "Nature," vol. 198, June 22, 1963, pp. 1192–1193.

EDWARD J. MEROS, *Primary Examiner.*